(12) United States Patent
Kokoszka et al.

(10) Patent No.: US 12,488,572 B2
(45) Date of Patent: Dec. 2, 2025

(54) SELF IMPROVING OBJECT RECOGNITION METHOD AND SYSTEM THROUGH IMAGE CAPTURE

(71) Applicant: RODAC TECHNOLOGIES LTD., Seoul (KR)

(72) Inventors: Robert Adam Kokoszka, Seoul (KR); Grant Warren Woodford, Seoul (KR)

(73) Assignee: RODAC TECHNOLOGIES LTD., Seoul (KR)

(*) Notice: Subject to any disclaimer, the term of this patent is extended or adjusted under 35 U.S.C. 154(b) by 379 days.

(21) Appl. No.: 18/246,102

(22) PCT Filed: Jun. 9, 2021

(86) PCT No.: PCT/KR2021/007196
§ 371 (c)(1),
(2) Date: Mar. 21, 2023

(87) PCT Pub. No.: WO2022/065629
PCT Pub. Date: Mar. 31, 2022

(65) Prior Publication Data
US 2023/0360373 A1  Nov. 9, 2023

(30) Foreign Application Priority Data

Sep. 22, 2020 (KR) .................. 10-2020-0121995
Mar. 19, 2021 (KR) .................. 10-2021-0036107

(51) Int. Cl.
*G06V 10/00* (2022.01)
*G06V 10/764* (2022.01)
(Continued)

(52) U.S. Cl.
CPC .......... *G06V 10/774* (2022.01); *G06V 10/764* (2022.01); *G06V 10/776* (2022.01);
(Continued)

(58) Field of Classification Search
CPC ............ G06N 3/02; G06N 3/08; G06N 3/042; G06N 3/045; G06N 3/047; G06N 3/082;
(Continued)

(56) References Cited

U.S. PATENT DOCUMENTS

| 8,429,168 B1 | 4/2013 | Chechik et al. |
| 8,447,112 B2 | 5/2013 | Paul et al. |

(Continued)

FOREIGN PATENT DOCUMENTS

| KR | 10-2013-0033909 A | 4/2013 |
| KR | 10-2013-0045514 A | 5/2013 |

(Continued)

OTHER PUBLICATIONS

International Search Report of PCT/KR2021/007196 mailed Sep. 8, 2021, English translation.

*Primary Examiner* — Amir Alavi
(74) *Attorney, Agent, or Firm* — DICKINSON WRIGHT PLLC

(57) ABSTRACT

Provided are a self-improving object recognition method and system through image capture. The object recognition method includes: collecting a first captured image through a user terminal; predicting image capturing conditions of the first captured image; verifying the first captured image using the predicted image capturing conditions and adding the first captured image to a verified dataset; training an object recognition model using the verified dataset; and acquiring a recognition result of an object indicated by a second captured image using the trained object recognition model.

12 Claims, 12 Drawing Sheets

(51) Int. Cl.
  *G06V 10/774* (2022.01)
  *G06V 10/776* (2022.01)
  *G06V 10/778* (2022.01)
  *G06V 10/94* (2022.01)

(52) U.S. Cl.
  CPC ...... *G06V 10/7788* (2022.01); *G06V 10/7792* (2022.01); *G06V 10/945* (2022.01); *G06V 2201/10* (2022.01)

(58) Field of Classification Search
  CPC .... G06N 3/092; G06N 3/0454; G06N 3/0475; G06N 3/0464; G06N 20/00; G06N 20/10; G06N 20/20; G06V 10/82; G06V 10/774; G06V 10/7788; G06V 10/7792; G06V 10/7784; G06V 10/776; G06V 10/764; G06V 10/945; G06T 2207/20081; G06T 2207/20084; G06F 16/53; G06F 16/951; G06Q 20/06; G06Q 30/02
  See application file for complete search history.

(56) References Cited

U.S. PATENT DOCUMENTS

| | | | |
|---|---|---|---|
| 8,520,909 B2 | 8/2013 | Leung et al. | |
| 8,831,358 B1 | 9/2014 | Song et al. | |
| 8,860,174 B2 | 10/2014 | Smith et al. | |
| 8,903,167 B2 | 12/2014 | Kohli et al. | |
| 9,275,308 B2 | 3/2016 | Szegedy et al. | |
| 9,536,178 B2* | 1/2017 | Mohamed | G06V 10/87 |
| 9,536,517 B2 | 1/2017 | Williams et al. | |
| 10,650,040 B2* | 5/2020 | Dube | G06V 10/75 |
| 10,664,722 B1 | 5/2020 | Sharma et al. | |
| 10,699,126 B2 | 6/2020 | Karyodisa et al. | |
| 11,526,704 B2* | 12/2022 | Guo | G06F 18/217 |
| 12,067,769 B2* | 8/2024 | Bossard | G06V 10/987 |
| 12,211,311 B2* | 1/2025 | Park | G06V 10/454 |
| 12,266,150 B2* | 4/2025 | Cui | G06F 18/23 |
| 12,315,240 B2* | 5/2025 | Xu | G06V 10/80 |
| 2007/0262415 A1 | 11/2007 | Smith et al. | |
| 2009/0185723 A1* | 7/2009 | Kurtz | G06V 40/50 382/118 |
| 2011/0317885 A1 | 12/2011 | Leung et al. | |
| 2015/0014811 A1 | 1/2015 | Smith et al. | |
| 2015/0170002 A1 | 6/2015 | Szegedy et al. | |
| 2016/0180151 A1 | 6/2016 | Philbin et al. | |
| 2018/0285663 A1 | 10/2018 | Viswanathan et al. | |
| 2023/0360373 A1* | 11/2023 | Kokoszka | G06V 10/945 |

FOREIGN PATENT DOCUMENTS

| | | |
|---|---|---|
| KR | 10-2017-0101455 A | 9/2017 |
| KR | 10-2019-0037770 A | 4/2019 |
| KR | 10-2019-0119219 A | 10/2019 |
| KR | 10-2020-0039043 A | 4/2020 |

\* cited by examiner

SELF IMPROVING OBJECT RECOGNITION METHOD AND SYSTEM THROUGH IMAGE CAPTURE

CROSS-REFERENCE TO RELATED APPLICATIONS

This application is a 35 U.S.C. § 371 national phase of PCT International Application No. PCT/KR2021/007196, filed Jun. 9, 2021, which claims the benefit of priority under 35 U.S.C. § 119 to Korean Patent Application No. 10-2020-0121995, filed Sep. 22, 2020, and Korean Patent Application No. 10-2021-0036107, filed Mar. 19, 2021, the contents of which are incorporated herein by reference in its entirety.

FIELD

The present invention relates to a self-improving object recognition method and system through image capture.

BACKGROUND

An artificial intelligence image recognition technology that recognizes an object using artificial intelligence may include a technology that classifies a specific object in an image (classification), a technology that detects several objects at the same time (detection), a technology that identifies and segments objects in units of pixels (segmentation), and the like. A quality level of the artificial intelligence image recognition technology has become high due to deep learning, but the deep learning requires a large amount of data and computing power in a learning process.

In order to overcome such a limitation of artificial intelligence learning, research into various technologies such as self-supervised learning for reducing annotations required for learning by finding a required feature by itself and appropriately expressing the required feature in order to solve a problem, active learning that selects, annotates, and learns data that may significantly contribute to learning, learning automation, transfer learning that learns a target domain from a source domain, and the like, has been actively conducted.

SUMMARY

The present invention has been made in an effort to provide an object recognition method and system having advantages of providing a dataset in which various conditions are combined with each other as training data for training an artificial intelligence model for object recognition.

The present invention has also been made in an effort to provide an object recognition method and system having advantages of accurately recognizing an object from captured images of various image capturing conditions by using an object recognition model and an image capturing condition prediction model together.

Particularly, an artificial intelligence system may be subjected to confusion due to new data that is unknown. In this case, the intervention of persons (data scientists or engineers) is generally required in order to sort, classify, and label the new data and then re-introduce the new data into a new learning model. Therefore, according to exemplary embodiments of the present invention, confusion due to new data is prevented and separate intervention of persons for introducing the new data into a learning model is not required because the entire process is automated without the intervention of persons such as engineers or data scientists.

In addition, the artificial intelligence system may not generally know what data is missing or what new data is required to improve accuracy in various conditions, and traditionally requires the intervention of data scientists or engineers, which is time consuming and expensive. Therefore, according to exemplary embodiments of the present invention, cost and time may be saved because a problem is self-diagnosed and specific data required for increasing a recognition rate is recognized and provided without the intervention of persons (engineers or data scientists) in order to improve accuracy of an artificial intelligence system, through an automated process.

An exemplary embodiment of the present invention provides an object recognition method including: collecting a first captured image through a user terminal; predicting image capturing conditions of the first captured image; verifying the first captured image using the predicted image capturing conditions and adding the first captured image to a verified dataset; training an object recognition model using the verified dataset; and acquiring a recognition result of an object indicated by a second captured image using the trained object recognition model.

The predicting of the image capturing conditions may include: providing the first captured image to a metadata classification server; and predicting the image capturing conditions of the first captured image using a plurality of image capturing condition prediction models of the metadata classification server.

The image capturing conditions of the first captured image may include a first detailed image capturing condition and a second detailed image capturing condition, and some of the plurality of image capturing condition prediction models may be used for prediction of the first detailed image capturing condition and the others of the plurality of image capturing condition prediction models may be used for prediction of the second detailed image capturing condition.

The object recognition method may further include training the plurality of image capturing condition prediction models using the verified dataset including the predicted image capturing conditions as a label.

The adding of the first captured image to the verified dataset may include: providing a quiz to a user; verifying the first captured image based on an answer to the quiz; and adding the verified first captured image to the verified dataset.

The providing of the quiz to the user may include: generating a prioritization ranking list (PRL) based on an accuracy breakdown report (ABR) indicating validation accuracy; and providing the quiz to the user based on the PRL.

The object recognition method may further include selecting an oracle among a plurality of users based on a quiz score of the user, wherein the providing of the quiz to the user may include providing the quiz to the oracle.

The selecting of the oracle among the plurality of users may include: calculating an accuracy score based on a plurality of previous quiz scores and a current quiz score; and selecting a user of which the accuracy score is in a predetermined upper range among the plurality of users as the oracle.

The object recognition method may further include: providing competition challenges to a user; and providing a reward to the user based on an answer to the competition challenges provided from the user.

The providing of the competition challenges to the user may include: generating a PRL based on an ABR indicating verification accuracy; and providing the competition challenges to the user based on the PRL.

The object recognition method may further include generating an initial object recognition model using a traditional dataset.

The object recognition method may further include generating an initial object recognition model without using a traditional dataset.

Another exemplary embodiment of the present invention provides an object recognition system includes: a metadata classification server predicting image capturing conditions of a first captured image collected through a user terminal; a verification server verifying the first captured image using the predicted image capturing conditions and adding the first captured image to a verified dataset; an artificial intelligence (AI) training server training an object recognition model using the verified dataset; and a prediction server acquiring a recognition result of an object indicated by a second captured image using the trained object recognition model.

The metadata classification server may predict the image capturing conditions of the first captured image using a plurality of image capturing condition prediction models.

The image capturing conditions of the first captured image may include a first detailed image capturing condition and a second detailed image capturing condition, and some of the plurality of image capturing condition prediction models may be used for prediction of the first detailed image capturing condition and the others of the plurality of image capturing condition prediction models may be used for prediction of the second detailed image capturing condition.

The AI training server may train the plurality of image capturing condition prediction models using the verified dataset including the predicted image capturing conditions as a label.

The verification server may provide a quiz to a user, verify the first captured image based on an answer to the quiz, and then add the verified first captured image to the verified dataset.

The object recognition system may further include a verification prioritization server generating a prioritization ranking list (PRL) based on an accuracy breakdown report (ABR) indicating validation accuracy, wherein the verification server may provide the quiz to the user based on the PRL.

The verification server may select an oracle among a plurality of users based on a quiz score of the user and provide the quiz to the oracle.

The verification server may calculate an accuracy score based on a plurality of previous quiz scores and a current quiz score and select a user of which the accuracy score is in a predetermined upper range among the plurality of users as the oracle.

The object recognition system may further include an incentive server providing competition challenges to a user and providing a reward to the user based on an answer to the competition challenges provided from the user.

The object recognition system may further include an incentive prioritization server generating a PRL based on an ABR indicating verification accuracy, wherein the incentive server may provide the competition challenges to the user based on the PRL.

The AI training server may generate an initial object recognition model using a traditional dataset.

The AI training server may generate an initial object recognition model without using a traditional dataset.

Yet another exemplary embodiment of the present invention provides a computer-readable medium in which a program is recorded, the program causing a computer to execute the following steps of: collecting a first captured image through a user terminal; predicting image capturing conditions of the first captured image; verifying the first captured image using the predicted image capturing conditions and adding the first captured image to a verified dataset; training an object recognition model using the verified dataset; and acquiring a recognition result of an object indicated by a second captured image using the trained object recognition model.

According to exemplary embodiments of the present invention, recognition accuracy of a captured image of a previously unknown or uncertain object may be effectively increased without using a large amount of data and computing power, such that a recognition quality may be reliably improved.

DETAILED DESCRIPTION

Figure 1A:
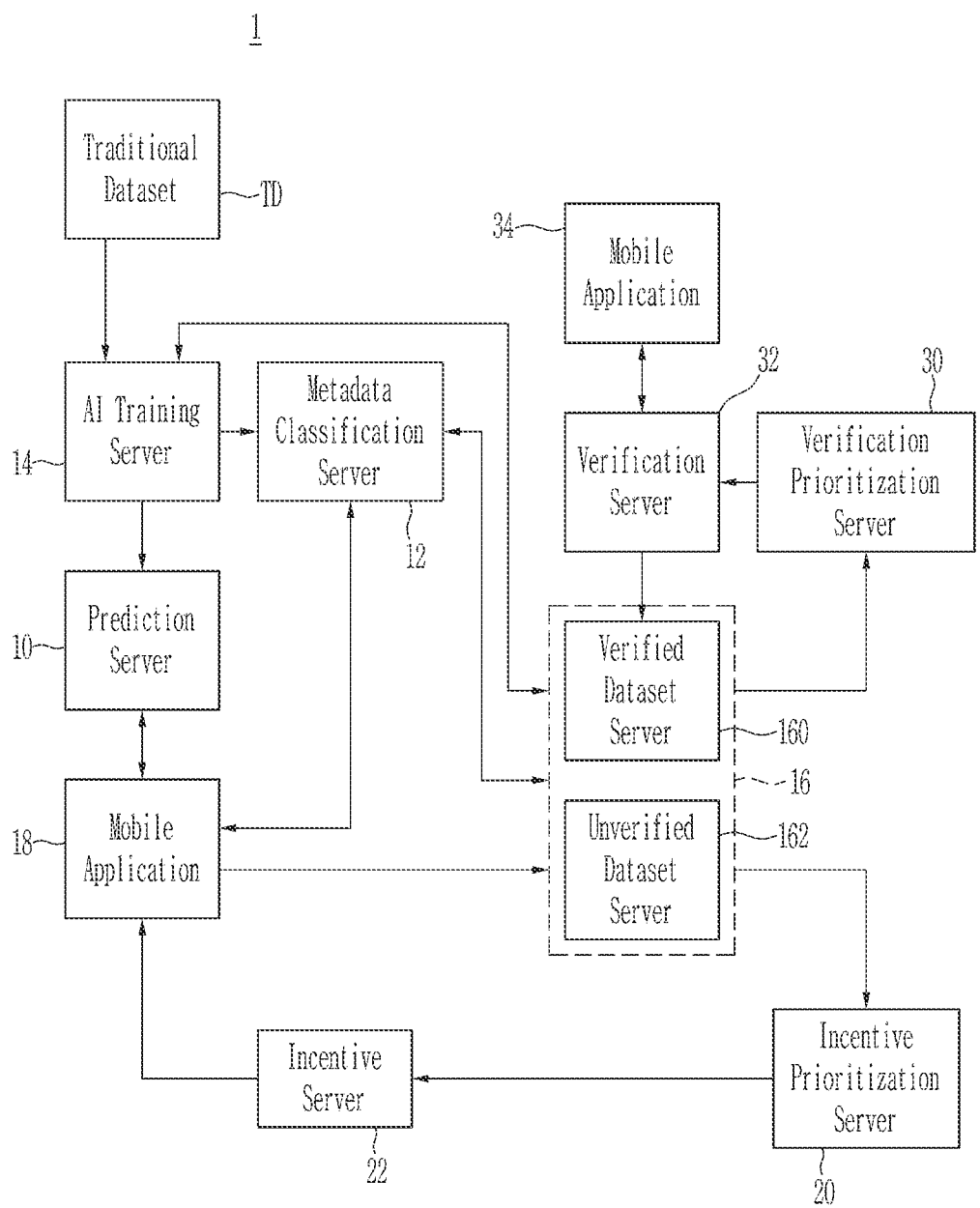
FIGS. 1A and 1B are block diagrams for describing an object recognition system according to an exemplary embodiment of the present invention.

Hereinafter, exemplary embodiments of the present invention will be described more fully with reference to the accompanying drawings so as to be easily practiced by those skilled in the art to which the present invention pertains. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification and the claims, unless explicitly described to the contrary, the word "comprise" and variations such as "comprises" or "comprising", will be understood to imply the inclusion of stated elements but not the exclusion of any other elements.

In addition, the term "unit", "-er/or", "module", or the like, as used herein may refer to a unit capable of at least one function or operation described herein, and may be implemented by hardware or software or a combination of hardware and software.

Figure 1B:
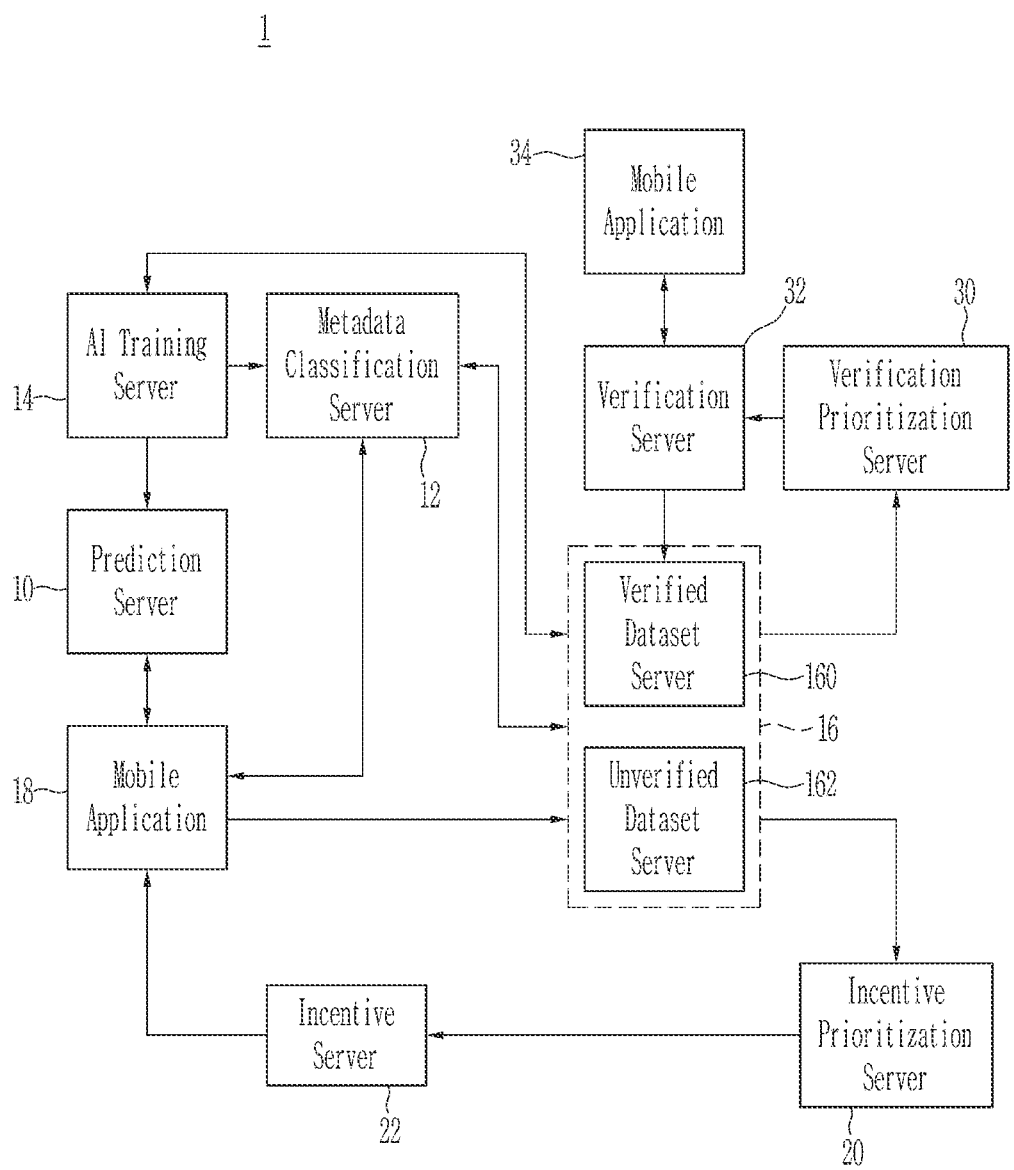

FIGS. 1A and 1B are block diagrams for describing an object recognition system according to an exemplary embodiment of the present invention.

Referring to FIG. 1A, an object recognition system 1 according to an exemplary embodiment of the present invention may include a prediction server 10, a metadata classification server 12, an AI training server 14, a dataset server 16, user terminals 18 and 34 on which a mobile application is executed, an incentive prioritization server 20, an incentive server 22, a verification prioritization server 30, and a verification server 32.

In the present exemplary embodiment, the prediction server 10, the metadata classification server 12, the AI training server 14, the dataset server 16, the incentive prioritization server 20, the incentive server 22, the verification prioritization server 30, and the verification server 32 shown in FIG. 1 are only logically distinguished from each other, and are not physically distinguish from each other. That is, at least some of the prediction server 10, the metadata classification server 12, the AI training server 14, the dataset server 16, the incentive prioritization server 20, the incentive server 22, the verification prioritization server 30, and the verification server 32 shown in FIG. 1 may be implemented as one entity, and an element denoted by one reference numeral in FIG. 1A may be implemented as a plurality of entities.

Figure 9:
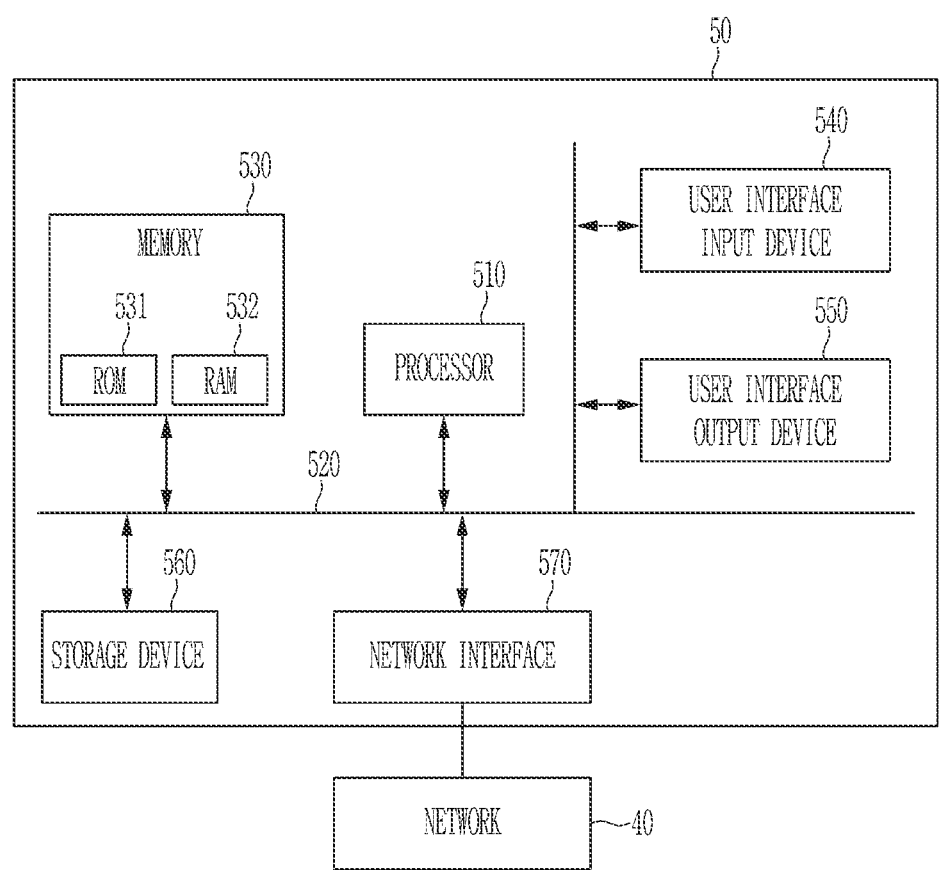
FIG. 9 is a block diagram for describing a computing device for implementing an object recognition method and system according to exemplary embodiments of the present invention.

In addition, an element "server" as used herein may refer to a hardware device having a processor and a memory, such as a computing device as shown in FIG. 9, refer to software itself that may be executed on any computing device to provide a service, or sometimes refer to a form implemented by a combination of hardware and software.

Meanwhile, the user terminals 18 and 34 on which the mobile application is executed may refer to smartphones, tablet computers, laptop computers, or the like, but the scope of the present invention is not limited thereto, and the user terminals 18 and 34 may refer to any computing device in which any operating system capable of executing the mobile application or any application that is not necessarily limited to the mobile application is installed.

Hereinafter, an object recognition system 1 capable of automatically providing images of conditions required for learning in order to increase accuracy of image recognition and self-improve a recognition rate to recognizing objects from captured images of various image capturing conditions will be described with reference to FIG. 1A.

First, the mobile application executed on the user terminal 18 may capture an image of an object. Specifically, the mobile application may perform image capturing of an object using a camera mounted in the user terminal 18, and collect captured images. In the present specification, it is assumed that the object is a vehicle for convenience of explanation, but a range of the object is not limited to the vehicle.

The captured image captured by the mobile application may be provided to the prediction server 10, the metadata classification server 12, or the dataset server 16.

The prediction server 10 may acquire a recognition result of the object indicated by the captured image using a trained object recognition model, and may provide the recognition result to the mobile application. For example, the prediction server 10 may recognize a vehicle indicated by the captured image to acquire a model and a manufacturer of the vehicle as a recognition result, and provide the recognition result to the mobile application to display the recognition result on the user terminal 18. Accordingly, a user of the user terminal 18 may obtain model and manufacturer information of the vehicle if he/her captures an image of the vehicle.

The AI training server 14 may train the object recognition model used by the prediction server 10 to recognize the object, and provide the trained object recognition model to the prediction server 10.

Here, the object recognition model may be a prediction model based on a neural network. Here, the neural network may be implemented as a convolutional neural network (CNN) widely used for image recognition, but the scope of the present invention is not limited thereto. A neural network-based artificial intelligence prediction model has a limitation in recognition rate due to the complexity of image information. That is, the artificial intelligence prediction model may sometimes make inaccurate decisions, for example, may not recognize the object in the image or may recognize the object as another object. Accordingly, research into methods for increasing accuracy of the artificial intelligence prediction model has been actively conducted.

In this regard, there are a method of manually adding curated data or images to a dataset, a method of automating mass data collection and performing filtering with persons or other artificial intelligence models, and the like. However, in such methods, a significant amount of data or images that are not very effective in improving performance of a prediction model may be collected or only valid data or images for a subsection of a specific useful image may be collected, a collection time is considerable, and the number of data or images that may be used to improve the performance of the prediction model may be small as compared with the collected images, which is inefficient.

In addition, even though the artificial intelligence prediction model may recognize an object in ideal conditions, when the conditions change, a recognition rate for the same object is decreased in many cases. Accordingly, in order to guarantee high accuracy even for various conditions in reality that are not the ideal conditions, a plurality of data or images in which various non-ideal conditions (or abnormal conditions) are combined with each other need to be included in a dataset.

Meanwhile, even though the data used in the artificial intelligence prediction model may be automatically collected, it is another problem to automatically, accurately, and efficiently classify or label new data of the collected data, and in general, persons should manually classify or label the new data or other artificial intelligence models should be used. In a case of using other artificial intelligence models, new data should be able to be properly classified and be labeled by training other artificial intelligence models so as to recognize an image through the dataset.

In order to solve such problems, an exemplary embodiment of the present invention has introduced a metadata prediction mechanism, a user verification mechanism, and a user reward mechanism in addition to the object recognition model used for object recognition into the prediction server 10. Due to the metadata prediction mechanism, the user validation mechanism, and the user reward mechanism, time and computing resources may not be consumed in collecting data or images that are not very helpful in improving the object recognition model, engineers or data scientists do not need to classify or label images or data or to manually identify problematic images, and ultimately, specific data or images that may most effectively improve the object recognition model may be acquired. Accordingly, the object recognition system 1 may recognize a zero accuracy/unknown image or a low accuracy image.

Accordingly, the object recognition system 1 may accurately recognize data that has been difficult to recognize, and may acquire more training data that may most effectively improve the object recognition model. For example, if the user captures an image of a blue Mercedes-Benz CLS made in 2020 at an inclined angle from the rear on a rainy night, a general prediction system provides results of very low accuracy because there are too many uncertain factors in object recognition.

Such uncertain low-accuracy images are automatically transmitted to the servers 30 and 32 implementing a quiz system for verification by the user (particularly, a user who identified the Mercedes-Benz CLS made in 2020 and was rewarded), and the metadata classification server 12 automatically identifies the images provided by the user through the image capturing condition prediction model, and then identifies important image capturing conditions or variables (e.g., an illumination condition, an image capturing angle, a color, an image capturing time, etc.).

That is, the metadata classification server 12 may predict image capturing conditions of a captured image using a plurality of image capturing condition prediction models. Here, the image capturing conditions may refer to any conditions (or environments) that may affect the captured image, such as an image capturing time (morning, afternoon, day, night, etc.), weather (sunny or cloudy), an image capturing angle, and a light amount (bright environment or dark environment). Accordingly, the metadata classification server 12 may predict the image capturing conditions from the captured image, and prediction results of the image capturing conditions may be provided to the user through the user terminal 18, but may be used to increase a recognition rate of the object indicated by the captured image.

The AI training server 14 may train the plurality of image capturing condition prediction models used by the metadata classification server 12 to predict the image capturing conditions, and provide the plurality of image capturing condition prediction models that are trained to the metadata classification server 12.

The dataset server 16 may include a verified dataset server 160 and an unverified dataset server 162. The verified dataset server 160 is a server that manages a set of captured image data after the object indicated by the captured image is verified, and the unverified dataset server 162 may be a server that manages a set of captured image data before verification of what the object indicated by the captured image is. Particularly, in an exemplary embodiment of the present invention, the term "verified" may refer to being verified by a user, and the term "unverified" may refer to being not verified by the user.

The verification prioritization server 30 and the verification server 32 implementing the quiz system may perform verification on the captured image in a manner of providing quizzes to a user of the user terminal 34 and collecting answers to the quizzes, and the incentive prioritization server 20 and the incentive server 22 implementing a competition challenge system may provide competition challenges to the user of the user terminal 18 and provide rewards to the user based on answers to the competition challenges.

The metadata classification server 12 may also be improved by the quiz system, and the competition challenge system may be combined with quiz data.

The metadata classification server 12 may predict the image capturing conditions (an image of the rear of the vehicle is captured at an inclined angle, rainy night, and a vehicle color is blue), and automatically create a competition challenge system to show the corresponding image (i.e., an image of the Mercedes-Benz CLS made in 2020, captured from the rear of the vehicle at an inclined angle on a rainy night) to the user in order verify the image capturing conditions predicted by the metadata classification server 12.

In this manner, the object recognition system 1 may recognize such a type of object with high accuracy in the future by automatically verifying the zero accuracy/unknown image or the low accuracy image to enhance the dataset.

Due to the excellent mechanism described above, the object recognition system 1 may automatically and quickly recognize a new object on which there was no information before, and may automatically acquire training data for training the object recognition model in order to recognize a new or unfamiliar object. In addition, the object recognition system 1 may not only recognize high-complexity images that have lowered the accuracy of the artificial intelligence prediction model in abnormal conditions with high accuracy, but also may automatically input new data into a training dataset by performing a prediction on metadata. That is, the object recognition system 1 may automate and perform a task of increasing a recognition rate for the zero accuracy/unknown image or the low accuracy image, may generate a learning model even when there is not enough data, and may increase a recognition rate of the learning model over time, by making data that has lowered the accuracy of the artificial intelligence prediction model due to high complexity, a new object, or the like, training data that may ultimately improve the object recognition model most effectively and self-improving the artificial intelligence prediction model using the training data.

Meanwhile, a manner in which the AI training server 14 trains the model in order to provide the trained object recognition model to the prediction server 10 or provide the plurality of image capturing condition prediction models that are trained to the metadata classification server 12 may include a fine-tuned bootstrapping (FB) manner or a zerolite bootstrapping (ZLB) manner.

The FB manner may be a manner that uses a traditional dataset (TD) when the AI training server 14 first trains the model, as shown in FIG. 1A. That is, the models, that is, the object recognition model and the plurality of image capturing condition prediction models, may be trained for the first time with the traditional dataset before the object recognition system is activated, and according to the FB manner, high initial accuracy may be obtained when the object recognition system is activated. That is, when the object recognition system is activated, it is likely that a first image (or data) provided to the prediction server 10 will be correctly identified.

Alternatively, the ZLB manner may be a manner that does not use the traditional dataset (TD) when the AI training server 14 first trains the model, as shown in FIG. 1B. That is, it refers to a case where there is no initial dataset in model training, and the object recognition model and the plurality of image capturing condition prediction models may be trained without using any prepared data before the object recognition system is activated. According to the ZLB manner, when the object recognition system is activated, initial accuracy may be lower than that of the FB manner.

The ZLB manner may include a zero-knowledge bootstrap (ZKB) manner and a partial knowledge bootstrap (PKB) manner. In the ZKB manner, no category is defined in the AI training server 14, and an image initially input to the prediction server 10 may be recognized as "unknown". That is, it may be said that initial accuracy of the object recognition model of the prediction server 10 is $_0$. The image recognized as "unknown" may be transferred to the verification server 32, and a category for such an image may be set, that is, classified, by the user through the verification server 32. The data classified and identified as described above may be provided to the verified dataset server 160 as verified data. In addition, the verified data may be used by the AI training server 14 in order to train the object recognition model and the plurality of image capturing condition prediction models for the prediction server 10 and the metadata classification server 12.

In the PKB manner, a person (e.g., an engineer or a data scientist) sets a category, and there may be no data in the category (i.e., only a skeleton of the category may be set) at the time of setting the category. In the PKB manner, unlike the ZKB manner, initial accuracy of the object recognition model of the prediction server 10 is not 0, but it is still lower than the FB manner that uses the traditional dataset. When the object recognition system is activated, an image (or data) is provided to the prediction server 10, and it is highly likely that the image (or data) will be erroneously recognized with a very low confidence rate. The image (or data) erroneously recognized with the very low confidence rate may be transferred to the verification server 32, and may be classified by the user through the verification server 32. The data classified and identified as described above may be provided to the verified dataset server 160 as verified data. In addition, the verified data may be used by the AI training server 14 in order to train the object recognition model and the plurality of image capturing condition prediction models for the prediction server 10 and the metadata classification server 12.

Hereinafter, an object recognition system and an object recognition method according to the present invention will be described in detail with reference to FIGS. 2 to 8.

Figure 2:
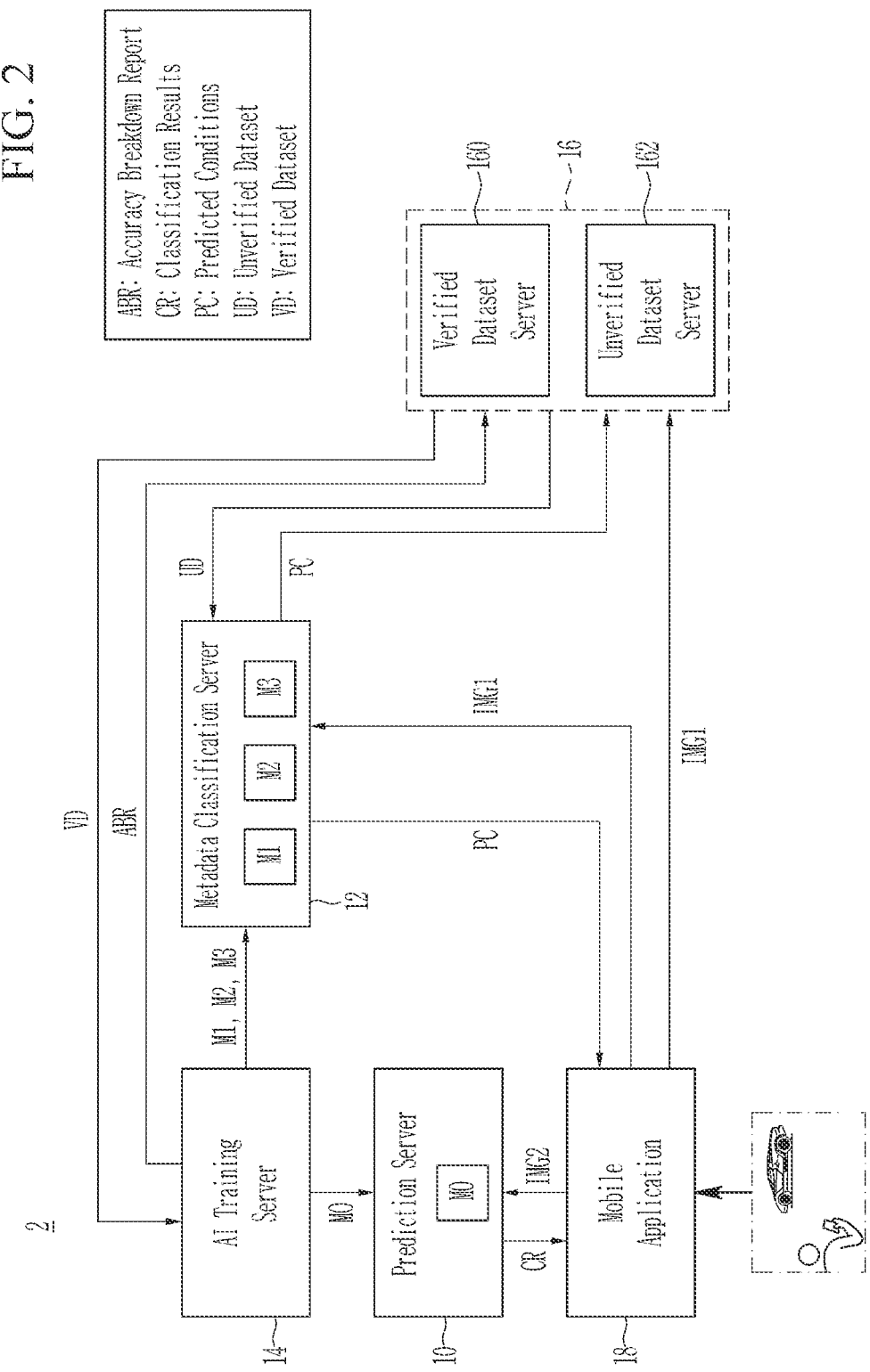
FIG. 2 is a block diagram for describing an object recognition system according to an exemplary embodiment of the present invention.

FIG. 2 is a block diagram for describing an object recognition system according to an exemplary embodiment of the present invention.

Referring to FIG. 2, an object recognition system 2 according to an exemplary embodiment of the present invention may include a prediction server 10, a metadata classification server 12, an AI training server 14, a dataset server 16, and a user terminal 18 on which a mobile application is executed.

The mobile application of the user terminal 18 may allow a user to capture an image of a vehicle. That is, the mobile application may collect a first captured image IMG1 through the user terminal 18. The mobile application may induce the user to capture the image of the vehicle to increase an amount of collection of captured images.

The first captured image IMG1 captured by the user is an unverified captured image, and may thus be transmitted to the unverified dataset server 162. The unverified dataset server 162 may store the first captured image IMG1 as an unverified dataset, and then provide the first captured image IMG1 to the incentive prioritization server 20 and the verification prioritization server 30 for verification of the dataset.

In addition, the first captured image IMG1 may be transmitted to the prediction server 10, and the prediction server 10 may recognize the vehicle indicated by the captured image using an object recognition model M0 and acquire model and manufacturer information of the vehicle. Here, the object recognition model M0 may have a convolutional neural network (CNN) model structure, but the scope of the present invention is not limited thereto. The model and manufacturer information of the vehicle, which is a recognition result, may be provided back to the mobile application of the user terminal 18.

In addition, the first captured image IMG1 may be transmitted from the mobile application to the metadata classification server 12, and the metadata classification server 12 may predict image capturing conditions of the first captured image IMG1 using a plurality of image capturing condition prediction models M1, M2, and M3, and then provide the predicted image capturing conditions PC back to the mobile application of the user terminal 18. That is, the metadata classification server 12 may predict the image capturing conditions using a collection of prediction models. The scope of the present invention is not limited thereto, and the metadata classification server 12 may also use only a single prediction model.

Here, the object recognition model M0 may recognize a model and a manufacturer of the vehicle indicated by the first captured image IMG1, and the plurality of image capturing condition prediction models M1, M2, and M3 may predict the image capturing conditions of the first captured image IMG1. In particular, the image capturing conditions of the first captured image IMG1 may include several detailed image capturing conditions. The detailed image capturing conditions may include, for example, any conditions (or environments) that may affect the captured image, such as an image capturing time (morning, afternoon, day, night, etc.), weather (sunny or cloudy), an image capturing angle, and a light amount (bright environment or dark environment). Some of the plurality of image capturing condition prediction models M1, M2, and M3 may be used to predict some of the several detailed image capturing conditions, and the others of the plurality of image capturing condition prediction models M1, M2, and M3 may be used to predict the others of the several detailed image capturing conditions. For example, the image capturing condition prediction model M1 may be used to predict the weather at the time of image capturing, the image capturing condition prediction model M2 may be used to predict the image capturing angle, and the image capturing condition prediction model M3 may be used to predict the light amount at the time of image capturing.

Meanwhile, the metadata classification server 12 may receive a verified captured image VD or an unverified captured image UD from the dataset server 16, predict image capturing conditions for the received captured images VD and UD using the plurality of image capturing condition prediction models M1, M2, and M3, label the predicted image capturing conditions PC on the captured images VD and UD), and then transmit the image capturing conditions PC back to the dataset server 16. That is, the metadata classification server 12 may predict the image capturing conditions for the captured images VD and UD that do not have information on the image capturing condition including any conditions (or environments) that may affect the captured image, such as an image capturing time (morning, afternoon, day, night, etc.), weather (sunny or cloudy), an image capturing angle, and a light amount (bright environment or dark environment), and then label prediction results.

The captured images VD and UD on which the image capturing conditions are labeled may be used as training data for training the models M0, M1, M2, and M3.

The AI training server 14 may receive training datasets for various vehicles. Specifically, the AI training server 14 may receive a verified dataset VD as the training dataset from the dataset server 16. The AI training server 14 may train the object recognition model M0 with the received training dataset, and may provide the trained object recognition model M0 to the prediction server 10.

Particularly, the AI training server 14 may receive a verified dataset VD in which the image capturing conditions are labeled as the training dataset from the dataset server 16. The AI training server 14 may train the plurality of image capturing condition prediction models M1, M2, and M3 with the training dataset in which the received image capturing conditions are labeled, and may provide the plurality of image capturing condition prediction models M1, M2, and M3 to the metadata classification server 12.

Meanwhile, the AI training server 14 may transmit an accuracy breakdown report (ABR) to the dataset server 16 after completing the training. Here, the ABR indicates validation accuracy, and may be provided to the incentive prioritization server 20 and the verification prioritization server 30 for verification of the dataset. Here, the ABR may include information such as a size of the dataset, verification accuracy, reporting of the user indicating that classification has been erroneously performed, a vehicle model predicted with low confidence by the artificial intelligence model, and a vehicle model or condition with significant discrepancy between prediction results by the artificial intelligence model and classification results by an oracle.

In various exemplary embodiments of the present invention, the metadata classification server 12 may make prediction performance of the object recognition system 2 more accurate and robust in an automated manner.

The object recognition system 2 should recognize a plurality of vehicles or objects in various conditions such as low illuminance, nighttime, snowy weather, rare colors, and unusual angles in order to support a large number of vehicles or objects and in order to be able to be used in a huge number of various situations and conditions. Such unusual conditions may reduce artificial intelligence recognition accuracy.

The object recognition system 2 collects a large amount of confusing data that should be classified and labeled before being used to train a new artificial intelligence model, in order to improve the artificial intelligence recognition accuracy. Such a task may traditionally be conducted manually, but it takes too much time to sort and classify these huge amounts of data or images.

The metadata classification server 12 may automatically identify the conditions to appropriately label the data and allow the data to be usable for training of the artificial intelligence prediction model in the future. The data classified and labeled as described above is analyzed and used for training of a new and more accurate artificial intelligence prediction model, and the new artificial intelligence prediction model improves the artificial intelligent recognition accuracy.

Specifically, an accuracy weakness of an artificial intelligent system may be solved only if the artificial intelligence prediction model identifies conditions under which it does not properly operate. Accordingly, data analysis should be performed. For example, only if it is identified that artificial intelligence recognition operates well in the daytime but does not operate at night or it is identified that the artificial intelligence recognition operates well on a vehicle image of a front angle but does not operate on a vehicle image of a rear angle, through the data analysis, the accuracy may be improved. Accordingly, the metadata classification server 12 may generate a label for the conditions, which is necessary to generate a detailed artificial intelligence prediction model accuracy report (i.e., the ABR generated by the AI training server 14). Such an artificial intelligence prediction model accuracy report may be used in the verification prioritization server 30 in order to designate a priority of data to be verified or may be used by the incentive prioritization server 20 to designate a priority of data to be collected.

When the artificial intelligence prediction model is given an image of the BMW 3 Series captured at a front angle in the daytime, recognition accuracy of the image will be high, but when the artificial intelligence prediction model is given an image of the BMW 3 Series captured at a rear angle, recognition accuracy of the image may be decreased. Accordingly, the metadata classification server 12 predicts what conditions exist in the image or the data using the artificial intelligence prediction model in order to automatically label the data.

Thereafter, the metadata classification server 12 may identify and classify captured images captured at the rear angle at night as a training result, and the incentive prioritization server 20 may designate a priority of data collection (with the BMW 3 Series captured at the rear angle at night) and provide training data for new artificial intelligence training to improve recognition accuracy of the object recognition system 3.

Particularly, the object recognition system may continuously increase accuracy and self-expand a function by operating together with the metadata prediction mechanism, the user verification mechanism, and the user reward mechanism to automatically discover the training data for training the artificial intelligence prediction model, and may thus generate a recognition model with only a small amount of data and improve its recognition accuracy.

Figure 3A:
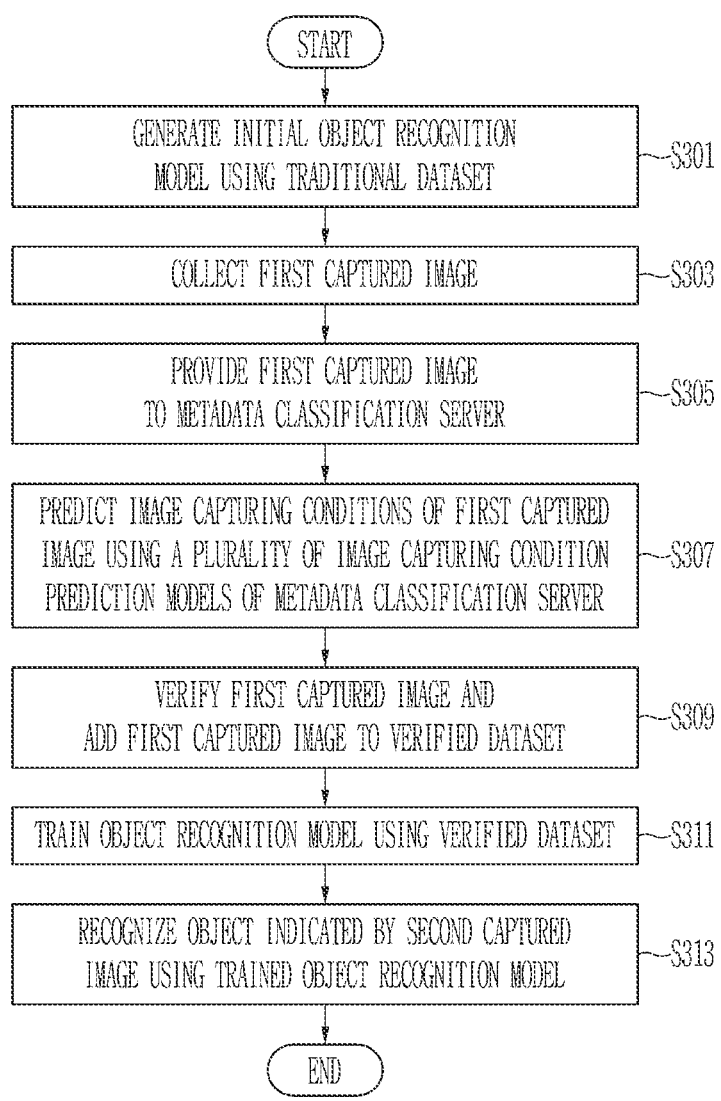
FIGS. 3A and 3B are flowcharts for describing an object recognition method according to an exemplary embodiment of the present invention.
Figure 3B:
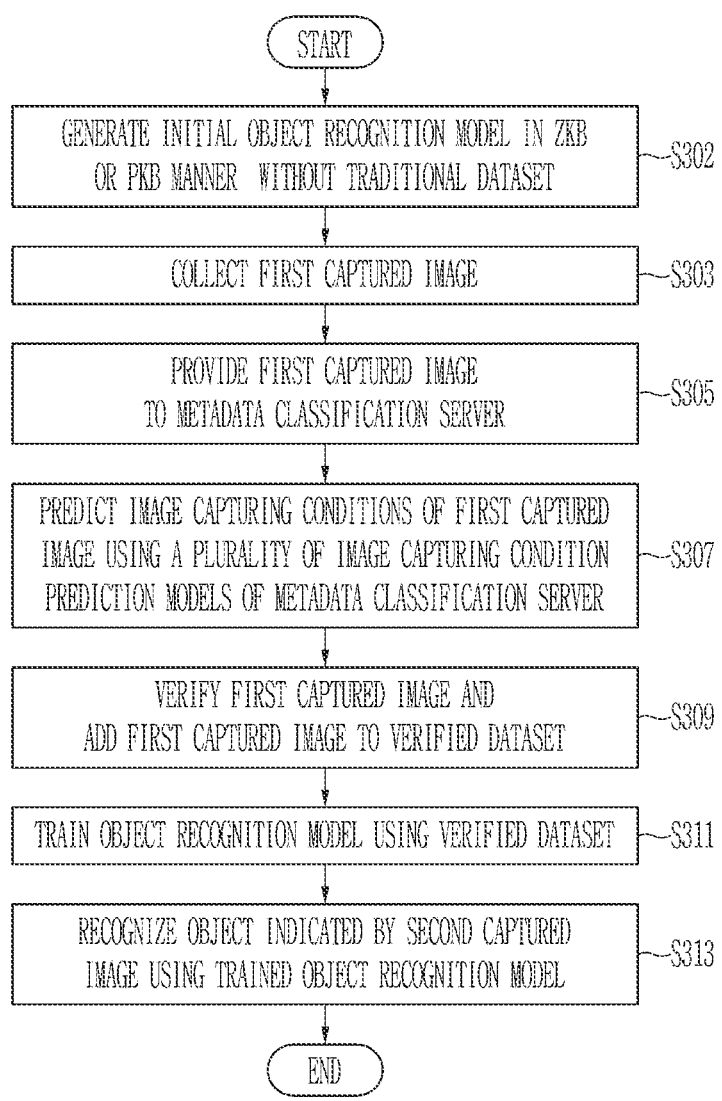

FIGS. 3A and 3B are flowcharts for describing an object recognition method according to an exemplary embodiment of the present invention.

Referring to FIG. 3A, an object recognition method according to an exemplary embodiment of the present invention may include generating an initial object recognition model using a traditional dataset (S301); collecting the first captured image IMG1 through the user terminal 18 (S303); providing the first captured image IMG1 to the metadata classification server 12 (S305); predicting image capturing conditions of the first captured image IMG1 using the plurality of image capturing condition prediction models M1, M2, and M3 of the metadata classification server 12 (S307); verifying the first captured image IMG1 using the predicted image capturing conditions PC and adding the first captured image IMG1 to the verified dataset (S309); self-training the object recognition model M0 using the verified dataset (S311); and acquiring a recognition result of an object indicated by a second captured image IMG2 using the trained object recognition model M0 (S313).

Next, referring to FIG. 3B, an object recognition method according to an exemplary embodiment of the present invention may include generating an initial object recognition model in a ZKB or PKB manner without a traditional dataset (S302); collecting the first captured image IMG1 through the user terminal 18 (S303); providing the first captured image IMG1 to the metadata classification server 12 (S305); predicting image capturing conditions of the first captured image IMG1 using the plurality of image capturing condition prediction models M1, M2, and M3 of the metadata classification server 12 (S307); verifying the first captured image IMG1 using the predicted image capturing conditions PC and adding the first captured image IMG1 to the verified dataset (S309); self-training the object recognition model M0 using the verified dataset (S311); and acquiring a recognition result of an object indicated by a second captured image IMG2 using the trained object recognition model M0 (S313).

That is, in the object recognition method according to FIG. 3A, model training may be performed according to the FB manner described above with reference to FIG. 1A, and in the object recognition method according to FIG. 3B, model training may be performed according to the ZLB manner described above with reference to FIG. 1B.

In relation to S307, the image capturing conditions of the first captured image IMG1 may include a first detailed image capturing condition and a second detailed image capturing condition, and some of the plurality of image capturing condition prediction models M1, M2, and M3 may be used for prediction of the first detailed image capturing condition and the others of the plurality of image capturing condition prediction models M1, M2, and M3 may be used for prediction of the second detailed image capturing condition.

In addition, the object recognition method may further include training the plurality of image capturing condition prediction models M1, M2, and M3 using a verified dataset including the predicted image capturing conditions PC as a label.

For more detailed contents of the object recognition method according to the present exemplary embodiment, reference may be made to the contents described above with reference to FIGS. 1A to 2, and a description of overlapping contents will be omitted.

Figure 4:
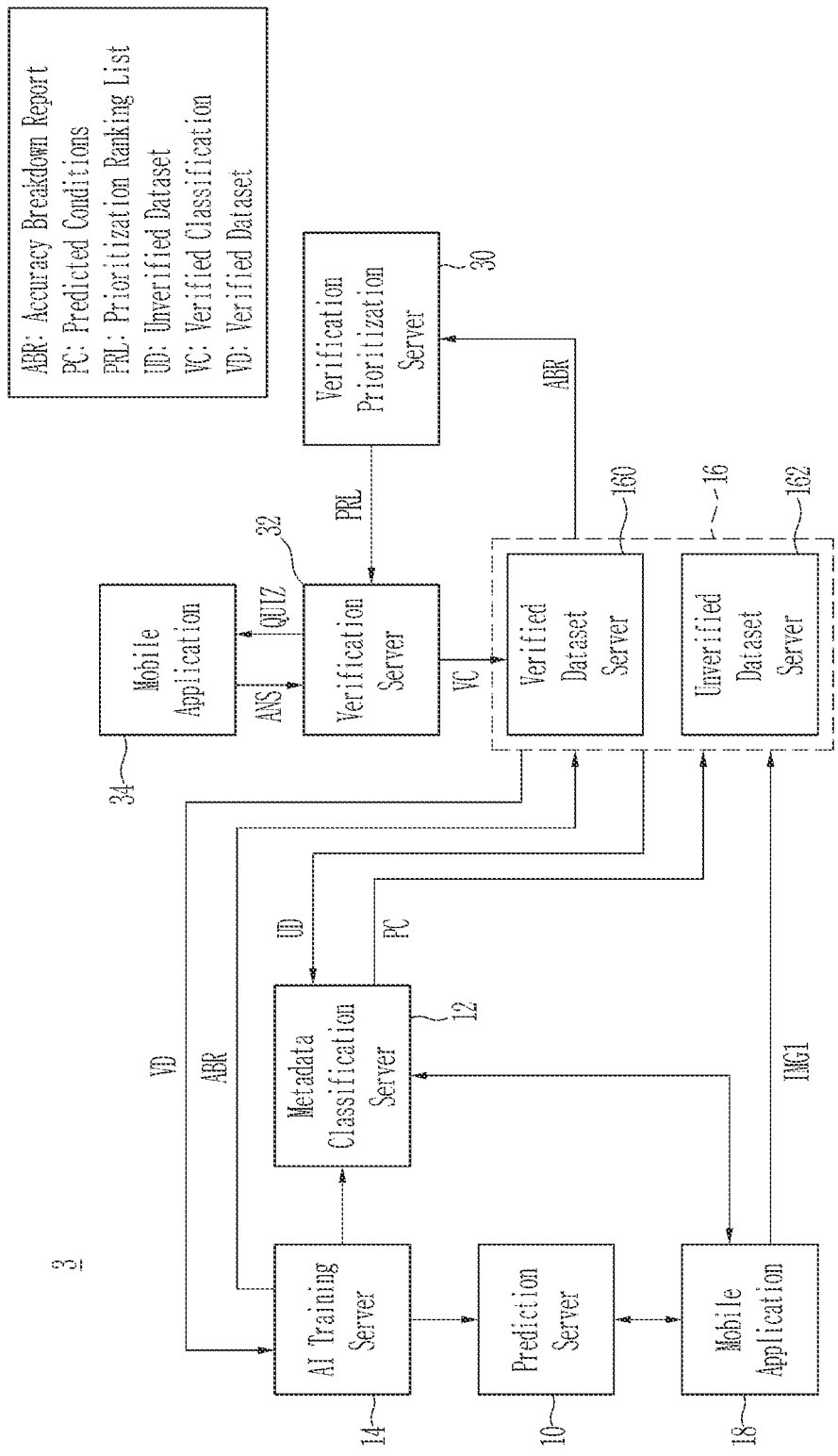
FIG. 4 is a block diagram for describing an object recognition system according to an exemplary embodiment of the present invention.

FIG. 4 is a block diagram for describing an object recognition system according to an exemplary embodiment of the present invention.

Referring to FIG. 4, an object recognition system 3 according to an exemplary embodiment of the present invention may include a prediction server 10, a metadata classification server 12, an AI training server 14, a dataset server 16, a verification prioritization server 30, a verification server 32, and user terminals 18 and 34 on which a mobile application is executed.

A user may capture an image of a vehicle through the mobile application of the user terminal 18 and then transmit a first captured image IMG1 to the dataset server 16. The dataset server 16, particularly, the unverified dataset server 162 may transmit an unverified dataset UD to the metadata classification server 12, and the metadata classification server 12 may label predicted image capturing conditions PC in the unverified dataset UD. In addition, the metadata classification server 12 may transmit the labeled unverified dataset UD to the dataset server 16.

The dataset server 16, particularly, the verified dataset server 160 may transmit a verified dataset VD in which the image capturing conditions are labeled to the AI training server 14, and the AI training server 14 may train the models M0, M1, M2, and M3 using the labeled verified dataset VD. In addition, the AI training server 14 may generate an ABR indicating verification accuracy and then transmit the ABR to the dataset server 16.

Here, the ABR may include information such as a size of the dataset, verification accuracy, reporting of the user indicating that classification has been erroneously performed, a vehicle model predicted with low confidence by the artificial intelligence model, and a vehicle model or condition with significant discrepancy between prediction results by the artificial intelligence model and classification results by an oracle.

The dataset server 16 may transmit the ABR to the verification prioritization server 30. The verification prioritization server 30 may generate a prioritization ranking list (PRL) and transmit the PRL to the verification server 32. The verification server 32 may provide a quiz QUIZ to the user through the mobile application of the user terminal 34 based on the PRL.

Here, the PRL may include priority rankings for a vehicle model or a challenge. These rankings are for determining which data to collect to maximize the accuracy of the artificial intelligence model, and various ranking algorithms may be used for this purpose.

As an example of the ranking algorithm, there is a method of scoring each of captured images based on the ABR. For example, a priority of a captured image of a vehicle captured from the rear at night may be higher than that of a captured image of the vehicle captured from the front in the daytime. Meanwhile, a priority of a captured image having little data on a manufacturer and a condition in the dataset server 16 may be higher than that of a captured image already having a large amount of data on a manufacturer and a condition.

That is, a captured image with a high potential for improvement of the artificial intelligence model has a higher priority, and a captured image with a low potential for improvement of the artificial intelligence model has a lower priority. In order to achieve this purpose, a ranking score may be determined in consideration of an amount of training data that already exists, verification accuracy for a vehicle model and manufacturer, a report of the user indicating that classification has been erroneously performed, reliability of artificial intelligence prediction, whether or not there is a discrepancy between prediction results by the artificial intelligence model and classification results of an oracle, and the like.

Meanwhile, users may verify model and manufacturer information of a given vehicle under various image capturing conditions as some of the quizzes. For example, the users may select a model and a manufacturer of a vehicle displayed in a captured image as some of objective or subjective questions. The image capturing conditions themselves may be presented as the quizzes.

Quizzes may be generated based on the PRL generated by the verification prioritization server 30, and are provided to the mobile application of the user terminal 34. The quizzes may be designed to validate a captured image that may more effectively train the artificial intelligence model in the future.

The user may give an answer ANS to the quiz QUIZ through the mobile application of the user terminal 34, and data on the quiz QUIZ may be provided back to the verification server 32. The verification server 32 may collect data on the quizzes (QUIZ) of the users, verify the first captured image from the data, and then add the verified first captured image to the verified dataset, that is, store the verified first captured image in the verified dataset server 160.

Particularly, the quiz may have contents for verifying the image capturing condition predicted by the metadata classification server 12, the verification of the image capturing condition may be performed using the data on the quiz, and the image capturing condition prediction model of the metadata classification server 12 may be trained using the captured image on which the verified image capturing condition is labeled, such that prediction performance of the object recognition system 3 may be improved.

Figure 5:
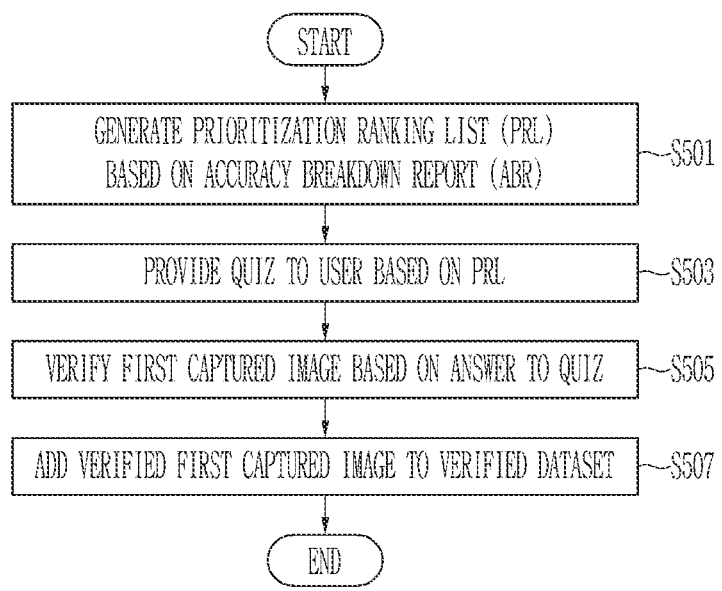
FIG. 5 is a flowchart for describing an object recognition method according to an exemplary embodiment of the present invention.

FIG. 5 is a flowchart for describing an object recognition method according to an exemplary embodiment of the present invention.

Referring to FIG. 5, an object recognition method according to an exemplary embodiment of the present invention may include generating a PRL based on an ABR indicating verification accuracy (S501); providing a quiz to the user based on the PRL (S503); verifying a first captured image IMG1 based on an answer to the quiz (S505); and adding the verified first captured image IMG1 to a verified dataset (S507).

For more detailed contents of the object recognition method according to the present exemplary embodiment, reference may be made to the contents described above with reference to FIGS. 1A to 4, and a description of overlapping contents will be omitted.

Figure 6:
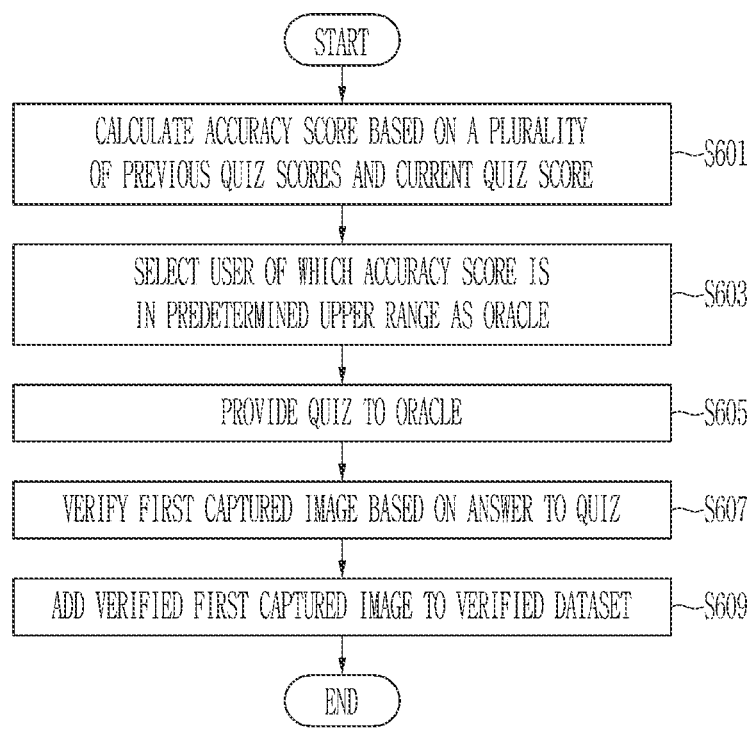
FIG. 6 is a flowchart for describing an object recognition method according to an exemplary embodiment of the present invention.

FIG. 6 is a flowchart for describing an object recognition method according to an exemplary embodiment of the present invention.

Referring to FIG. 6, an object recognition method according to an exemplary embodiment of the present invention may include calculating an accuracy score based on a plurality of previous quiz scores and a current quiz score (S601); selecting a user of which an accuracy score is in a predetermined upper range among a plurality of users as an oracle (S603); providing a quiz to an oracle (S605); verifying a first captured image IMG1 based on an answer to the quiz (S607); and adding the verified first captured Image IMG1 to a verified dataset (S609).

For more detailed contents of the object recognition method according to the present exemplary embodiment, reference may be made to the contents described above with reference to FIGS. 1A to 4, and a description of overlapping contents will be omitted.

A specific example of an oracle system is as follows.
1. The user may scan an actual vehicle as described above.
2. A full copy version of the user scan is transmitted to a quiz repository, which is a database of newly scanned vehicle images.
3. The metadata classification server creates attributes for each scanned image, such as directions and colors of vehicles, weather conditions, illumination conditions, landscapes, and persons in the images.
4. When a new quiz or competition challenge is created, new vehicle scan images may be randomly selected, or priorities of selections may be designated according to a specific criterion.

Priorities of new user scans may be designated in the following cases.

A case where a user reports that AI classification has been erroneously performed A case where there are few or no images for a specific vehicle model in an AI training data source database A case where there are few or no images for particularly important attributes (night scans, back scans, etc.)

A case where many oracles classify scans differently through a comparison with an AI recognition server.

A case where an AI vehicle model recognition server designates a flag for a scan as having low recognition reliability (for example, a case where an AI model output signal is less than a certain threshold value of 0.5)

A case where it is observed (from an incentive system) that accuracy is low when a recognized vehicle model or a user-designated vehicle model trains an AI recognition system, a case where the AI vehicle model recognition system has a difficulty in accurately identifying scans of specific conditions (e.g. a scan of a black BMW i8 captured at night)

Scans of which priorities are designated are important because they may be used to identify and correct a weakness of a currently deployed artificial intelligence model.
5. New vehicle scan may be selected for the quiz or the challenge.
6. Selected scans may be used to create the quiz or the challenge, and a ratio of the new scans to verified scans may be adjusted. That is, new scans of Y % and of already validated scans of (100−Y) % may be mixed and selected. For example, Y=20 may mean that scans of new vehicles of 20% and scans of already verified vehicles of 80% are included in the quiz. A degree of difficulty of the quiz may be adjusted based on a ratio of user accuracy of vehicle model identification obtained in the previous quiz.
7. The user is asked to identify a displayed vehicle scan for a displayed quiz or competition challenge through a mobile application.

The user may receive a reward (a reward in a game, a point, a prize money, a crypto token, a prize, etc.) according to selected accuracy through a comparison with verified scan vehicle model classification, and may receive a bonus reward when the previous quiz has been answered with high accuracy (consistent accuracy is rewarded and other users are prevented from answering the quiz).
8. An accuracy score for each quiz or competition challenge completed by the user is calculated, and an average of the previous quiz scores and a current quiz score is used to determine a score of the user. A user with a high score may accurately grasp a vehicle model classification in a user scan. An example of score calculation is as follows.

Score=([Average accuracy of previous $M$ quizzes]−
[Standard deviation of previous $M$ quizzes])*$p$+
([Accuracy of current quiz]*$(1-p)$)

Here, M is the number of previous quizzes used in the calculation and p is a percentage. When the user is punished with a high standard deviation from the accuracy of the previous quizzes, an inconsistent user may be removed, or other users may be allowed to answer the quiz.
9. A user getting a high score is selected as an oracle. For example, the top 10% of users getting the highest scores may be selected as oracles.
10. An oracle answer to each new scan included in the quiz is used to determine a vehicle model displayed in the scan. Such oracle answers are made through several quizzes, and when sufficient oracle users classify a new vehicle scan, aggregated answers are calculated. For example, when there are 100 oracle answers to a new vehicle scan and 90% of these oracle answers identify the scan as a BMW X3, the scan is classified as BMW X3 and is displayed to be validated.

When a consensus may not be determined among oracles, this may mean a kind of manual intervention. Alternatively, the incentive server may focus on designating a priority of the user scan in the oracle answers to the quiz.
11. A successfully classified scan are copied to a validated user scan database (dataset server) and incorporated into the quiz in the future. The validated user scan database (dataset server) is periodically shared with the AI system and is used to train the vehicle recognition AI model in the future.

Figure 7A:
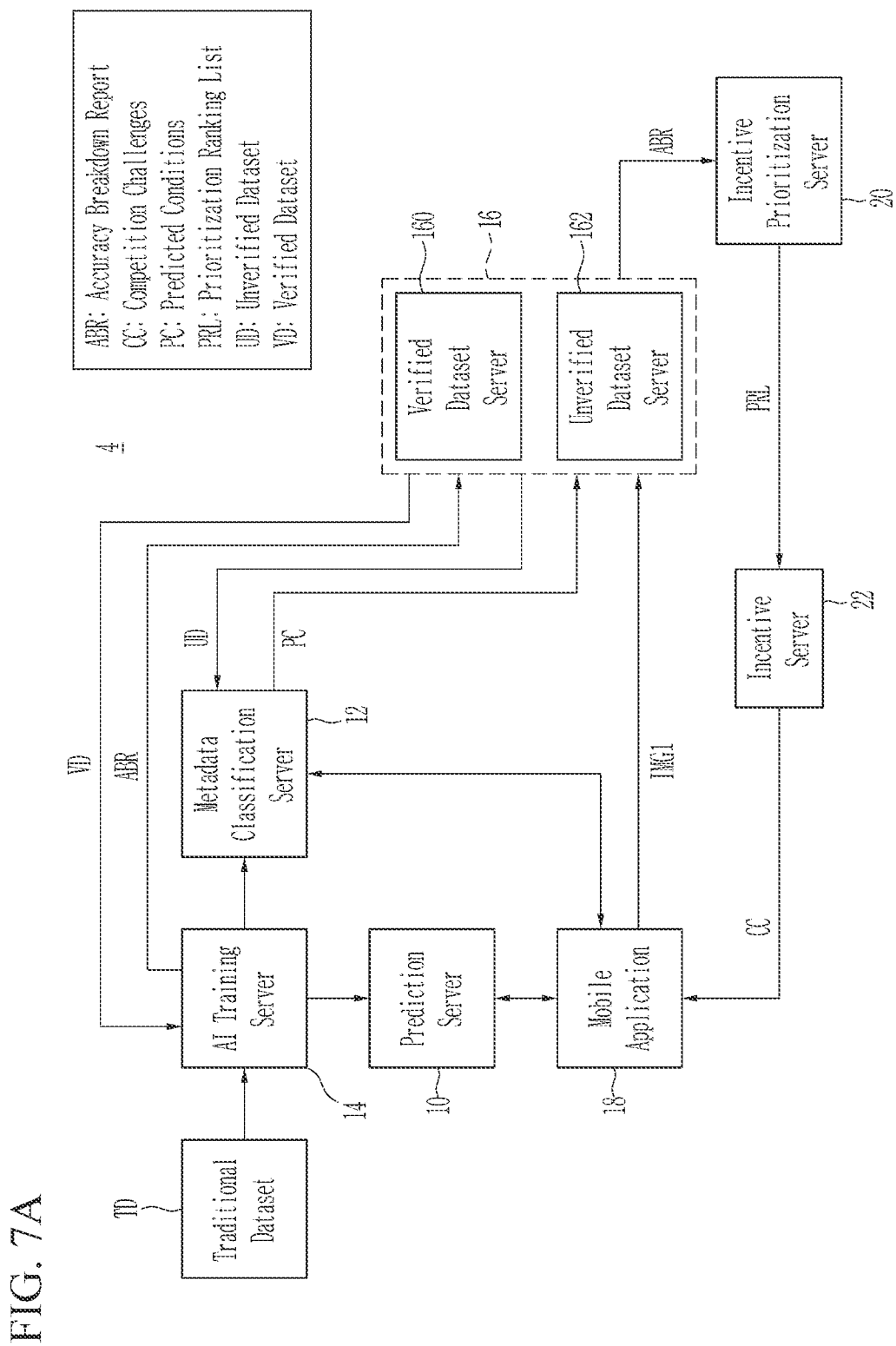
FIGS. 7A and 7B are block diagrams for describing an object recognition system according to an exemplary embodiment of the present invention.
Figure 7B:
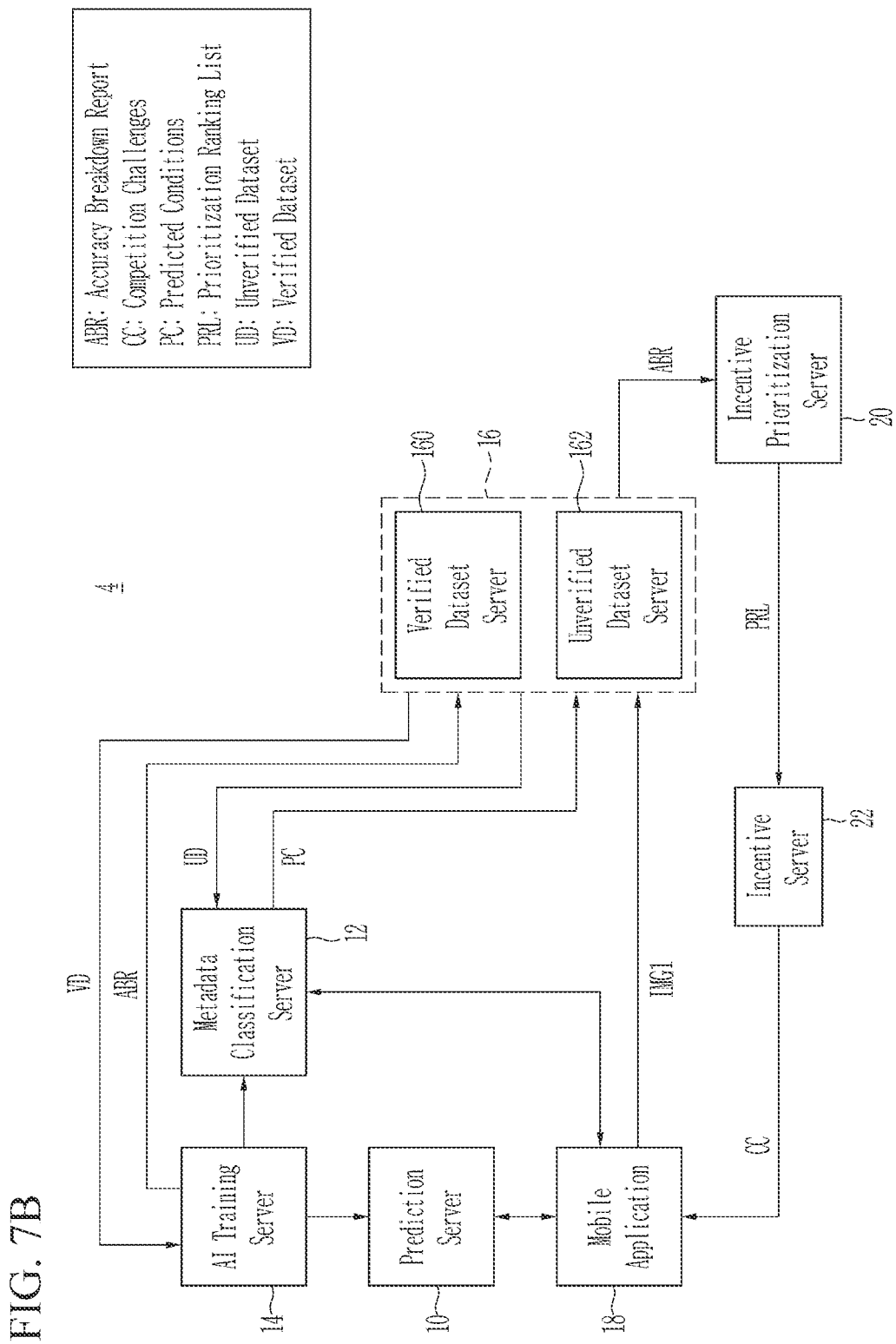

FIGS. 7A and 7B are block diagrams for describing an object recognition system according to an exemplary embodiment of the present invention.

Referring to FIG. 7A, an object recognition system 4 according to an exemplary embodiment of the present invention may include a prediction server 10, a metadata classification server 12, an AI training server 14, a dataset server 16, an incentive prioritization server 20, and an incentive server 22.

A user may capture an image of a vehicle through the mobile application of the user terminal 18 and then transmit a first captured image IMG1 to the dataset server 16. The dataset server 16, particularly, the unverified dataset server 162 may transmit an unverified dataset UD to the metadata classification server 12, and the metadata classification server 12 may label predicted image capturing conditions PC in the unverified dataset UD. In addition, the metadata classification server 12 may transmit the labeled unverified dataset UD to the dataset server 16.

The dataset server 16, particularly, the verified dataset server 160 may transmit a verified dataset VD in which the image capturing conditions are labeled to the AI training server 14, and the AI training server 14 may train the models M0, M1, M2, and M3 using the labeled verified dataset VD. In addition, the AI training server 14 may generate an ABR indicating verification accuracy and then transmit the ABR to the dataset server 16.

The dataset server 16 may transmit the ABR to the incentive prioritization server 20. The incentive prioritization server 20 may generate a PRL and transmit the PRL to the incentive server 22. The incentive server 22 may provide competition challenges CC to the user through the mobile application of the user terminal 18 based on the PRL.

The competition challenges CC may be to allow the user to find a model or a manufacture of a vehicle under a specific condition (a specific image capturing condition). For example, the competition challenges CC may allow the user to input the model, or the manufacturer of the vehicle indicated by a captured image captured under the specific condition. Alternatively, the competition challenges CC may induce the user to capture an image of the vehicle under the specific condition and input the corresponding condition. As such, the user may answer the competition challenges CC through the mobile application of the user terminal 34, and a reward may be provided to the user based on the answer to the competition challenges CC provided by the user.

Data collected in a manner of giving a reward to the user who have solved or performed such a competition challenges CC may be used to train the models M0, M1, M2, and M3.

Particularly, the competition challenges CC may have contents for verifying the image capturing conditions predicted by the metadata classification server 12, verification of the data collected in the manner of giving the reward to the user who have solved or performed the competition challenges CC may be performed, and the image capturing condition prediction model of the metadata classification server 12 may be trained using the captured image on which the verified image capturing conditions are labeled, such that the prediction performance of the object recognition system 4 may be improved.

Meanwhile, a manner in which the AI training server 14 trains the model in order to provide the trained object recognition model to the prediction server 10 or provide a plurality of image capturing condition prediction models that are trained to the metadata classification server 12 may include an FB manner or a ZLB manner, FIG. 7A shows that the AI training server 14 uses a traditional dataset when the AI training server 14 trains the model for the first time according to the FB manner, and FIG. 7B shows that the AI training server 14 does not use the traditional dataset when the AI training server 14 trains the model for the first time.

Figure 8:
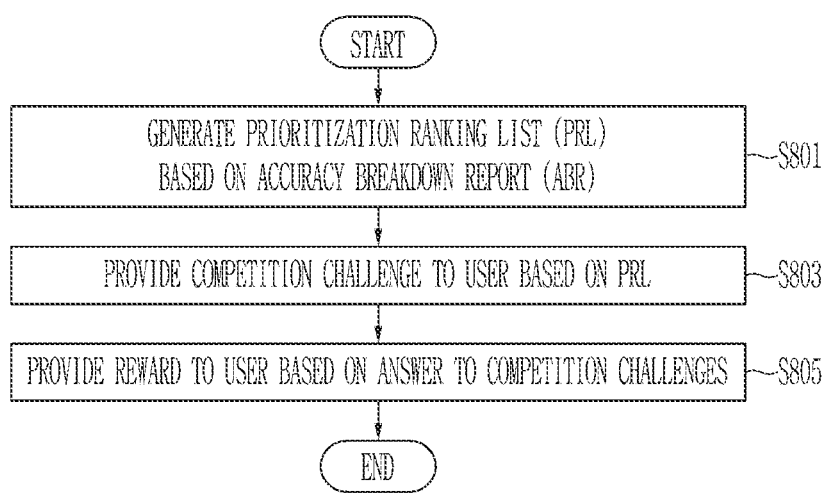
FIG. 8 is a flowchart for describing an object recognition method according to an exemplary embodiment of the present invention.

FIG. 8 is a flowchart for describing an object recognition method according to an exemplary embodiment of the present invention.

Referring to FIG. 8, an object recognition method according to an exemplary embodiment of the present invention may include generating a PRL based on an ABR indicating verification accuracy (S801); providing a competition challenge to a user based on the PRL (S803); and providing a reward to the user based on an answer to the competition challenges provided from the user (S805).

For more detailed contents of the object recognition method according to the present exemplary embodiment, reference may be made to the contents described above with reference to FIGS. 1A to 7B, and a description of overlapping contents will be omitted.

To summarize an operation of the object recognition system described so far, the user may collect an (unverified) original image through the mobile application, and the original image may be transmitted to the prediction server 10 or transmitted to the dataset server 16. The prediction server 10 may provide a recognition result of the original image to the user.

The dataset server 16 may provide the image to the metadata classification server 12 to allow the metadata classification server 12 to perform classification and labeling. The metadata classification server 12 may transmit a (unverified) newly classified and labeled image (in which the image capturing conditions are labeled) back to the dataset server 16.

The (unverified) classified and labeled image may be provided to the verification prioritization server 30, and the verification prioritization server 30 may output the PRL based on the report received from the AI training server 14. The PRL such as the vehicle model, the image capturing conditions, a training data size, and accuracy may be transmitted from the verification prioritization server 30 to the verification server 32, and the verification server 32 may create the quiz the user to verify the data.

The quiz data answered by the user is transferred to the verification server 32, and the verification server 32 classifies the data, and provides the verified classified result to the dataset server 16 to allow the verified classified result to be stored as "verified data".

Such a verified image is transmitted to the AI training server 14 to allow a new artificial intelligence prediction model dataset to be generated. In this case, it is highly likely that accuracy of the AI prediction model will be improved in the future by training of the AI prediction model.

Meanwhile, the AI training server 14 may generate the ABR using the newly verified dataset and transmit the ABR to the dataset server 16, the dataset server 16 may provide the ABR to the incentive prioritization server 20, and the incentive prioritization server 20 may generate the PRL and provide the PRL to the incentive server 22. The incentive server 22 may generate the competition challenges CC based on the PRL and provide the competition challenges CC to the user through the mobile application.

According to exemplary embodiments of the present invention described so far, recognition accuracy of a captured image of a previously unknown or uncertain object may be effectively increased without using a large amount of data and computing power, such that a recognition quality may be reliably improved.

In addition, the following effects may be expected.

Data collection, data labeling, and data cleaning are automated (traditionally, it takes much time to manually perform data collection, data labeling, and data cleaning)

Data generally confusing AI and producing low-accuracy recognition results are brought and converted into valuable training data that may help make an AI model much more accurate in the future Accuracy of recognition is determined and grouped under various conditions Weakness of a model is automatically identified by itself (self-diagnosing) (this task was a task traditionally performed by data scientists) by confirming actual data generated by users A more accurate AI model may be trained by designating priorities of data collection that has previously confused an AI recognition server are designated, classifying corresponding data, and then reusing these data (self-updating, self-repairing, or self-correcting)

A competition challenge or quiz is created to encourage a user to collect specific data required for a system (based on data identified to have a high necessity or a relevance in the system)

It is automatically confirmed whether or not data captured by a user satisfies our requirements and is useful Accuracy of an AI recognition server may be continuously increased by automatically adding an unknown new object to a system and designating a collection priority of a newly discovered object An engineer or a data scientist does not need to classify or label images or data or manually identify problematic images, such that time and money are saved Initial data does not need to be input for learning of a recognition model Accordingly, an object recognition system according to the present invention connected to a metadata classification server operates together with the metadata classification server in order to automate creation of an AI model, which takes the most time (i.e., may help to automate data labeling and cleaning and specifically target data most likely to improve the AI model). In addition, the object recognition system according to the present invention may continuously improve a dataset training a better AI model and automatically increasing recognition accuracy.

When a new vehicle that has never been seen before is released onto the market, the object recognition system according to the present invention has a process of automatically identifying a new vehicle model, labeling data, and integrating the data into the future AI model. For example, when a new vehicle model is first released in 2022, an image of the new vehicle model will be captured by the mobile application and added to an unconfirmed (unverified) dataset, and a new vehicle then appears in a quiz.

The quiz has an option to designate that a vehicle model is a new model, and the user may suggest a new vehicle model name. When the suggested name is input, autocomplete suggestion options that list previously suggested names (by other users) may be used for the new vehicle. The user may select one of the autocomplete options. If sufficient oracle users agree on the same model name, the new model name becomes an additional classification label. The incentive server starts including this new vehicle model in the competition challenge to induce users to capture more images of this new vehicle model.

When sufficient data on the new vehicle model are collected, a new AI model containing the new vehicle model classification may be trained.

FIG. 9 is a block diagram for describing a computing device for implementing an object recognition method and system according to exemplary embodiments of the present invention.

Referring to FIG. 9, an object recognition method and system according to exemplary embodiments of the present invention may be implemented using a computing device (or a computer) 50.

The computing device 50 may include at least one of a processor 510, a memory 530, a user interface input device 540, a user interface output device 550, and a storage device 560 that communicate with each other through a bus 520. The computing device 50 may also include a network interface 570 electrically connected to a network 40 such as a wireless network. The network interface 570 may transmit or receive signals to or from other entities through the network 40.

The processor 510 may be implemented in various types such as an application processor (AP), a central processing unit (CPU), and a graphic processing unit (GPU), and may be any semiconductor device that executes instructions stored in the memory 530 or the storage device 560. The processor 510 may be configured to implement the functions and methods described with reference to FIGS. 1A to 8.

The memory 530 and the storage device 560 may include various types of volatile or non-volatile storage media. For example, the memory 530 may be a read-only memory (ROM) 531 and a random-access memory (RAM) 532. In an exemplary embodiment of the present invention, the memory 530 may be positioned inside or outside the processor 510, and may be connected to the processor 510 through various known units.

In addition, the object recognition method and system according to exemplary embodiments of the present invention may be implemented as a program or software executed in the computing device 50, and the program or the software may be stored in a computer-readable medium.

In addition, the object recognition method and system according to exemplary embodiments of the present invention may be implemented as hardware capable of being electrically connected to the computing device 50.

The invention claimed is:

1. An object recognition system comprising:
a metadata classification server predicting image capturing conditions of a first captured image collected through a user terminal;
a verification server verifying the first captured image using the predicted image capturing conditions and adding the first captured image to a verified dataset;
an artificial intelligence (AI) training server training an object recognition model using the verified dataset; and
a prediction server acquiring a recognition result of an object indicated by a second captured image using the trained object recognition model.

2. The object recognition system of claim 1, wherein:
the metadata classification server predicts the image capturing conditions of the first captured image using a plurality of image capturing condition prediction models.

3. The object recognition system of claim 2, wherein:
the image capturing conditions of the first captured image include a first detailed image capturing condition and a second detailed image capturing condition, and
some of the plurality of image capturing condition prediction models are used for prediction of the first detailed image capturing condition and the others of the plurality of image capturing condition prediction models are used for prediction of the second detailed image capturing condition.

4. The object recognition system of claim 2, wherein:
the AI training server trains the plurality of image capturing condition prediction models using the verified dataset including the predicted image capturing conditions as a label.

5. The object recognition system of claim 1, wherein:
the verification server provides a quiz to a user, verifies the first captured image based on an answer to the quiz, and then adds the verified first captured image to the verified dataset.

6. The object recognition system of claim 5, further comprising
a verification prioritization server generating a prioritization ranking list (PRL) based on an accuracy breakdown report (ABR) indicating validation accuracy,
wherein the verification server provides the quiz to the user based on the PRL.

7. The object recognition system of claim 5, wherein:
the verification server selects an oracle among a plurality of users based on a quiz score of the user and provides the quiz to the oracle.

8. The object recognition system of claim 7, wherein:
the verification server calculates an accuracy score based on a plurality of previous quiz scores and a current quiz score and selects a user of which the accuracy score is in a predetermined upper range among the plurality of users as the oracle.

9. The object recognition system of claim 1, further comprising
an incentive server providing competition challenges to a user and providing a reward to the user based on an answer to the competition challenges provided from the user.

10. The object recognition system of claim 9, further comprising
an incentive prioritization server generating a PRL based on an ABR indicating verification accuracy,
wherein the incentive server provides the competition challenges to the user based on the PRL.

11. The object recognition system of claim 1, wherein:
the AI training server generates an initial object recognition model using a traditional dataset.

12. The object recognition system of claim 1, wherein:
the AI training server generates an initial object recognition model without using a traditional dataset.

* * * * *